US009742813B2

United States Patent
Antipa et al.

(10) Patent No.: US 9,742,813 B2
(45) Date of Patent: Aug. 22, 2017

(54) DETECTING POTENTIAL LEGAL DECRYPTION OF HISTORICAL DATA

(71) Applicant: ADOBE SYSTEMS INCORPORATED, San Jose, CA (US)

(72) Inventors: Damien Antipa, Saint-Louis (FR); Antonio Sanso, Duggingen (CH)

(73) Assignee: Adobe Systems Incorporated, San Jose, CA (US)

( * ) Notice: Subject to any disclaimer, the term of this patent is extended or adjusted under 35 U.S.C. 154(b) by 86 days.

(21) Appl. No.: 14/950,694

(22) Filed: Nov. 24, 2015

(65) Prior Publication Data
US 2017/0149841 A1    May 25, 2017

(51) Int. Cl.
*H04L 29/06*    (2006.01)
(52) U.S. Cl.
CPC .................................. *H04L 63/308* (2013.01)
(58) Field of Classification Search
CPC ..... H04L 63/30; H04L 63/302; H04L 63/304; H04L 63/306; H04L 63/308; H04L 63/0428
USPC .......................................................... 713/164
See application file for complete search history.

(56) References Cited

U.S. PATENT DOCUMENTS

| 2005/0022000 A1* | 1/2005 | Inomata ................... G06F 21/55 726/26 |
| 2010/0002880 A1* | 1/2010 | Yoon ....................... H04L 12/66 380/255 |
| 2015/0106624 A1* | 4/2015 | Gero ..................... H04L 9/0825 713/171 |

* cited by examiner

*Primary Examiner* — Yogesh Paliwal
(74) *Attorney, Agent, or Firm* — Shook, Hardy & Bacon L.L.P.

(57) ABSTRACT

Systems and methods provide for detecting the potential legal decryption of transmitted data. When a device connects to a server over a network, such as the Internet, the device determines whether a cipher without forward secrecy is used. If so, information regarding the connection is stored in a log. When the device subsequently connects to the server and receives a response code indicating that a resource is not available for legal reasons, the device checks the log to determine if the device has previously communicated with the server using a cipher without forward secrecy. Based on the check, the previous connection with the server is identified from the log. A message is presented indicating that data from the previous connection could be subject to legal decryption.

20 Claims, 4 Drawing Sheets

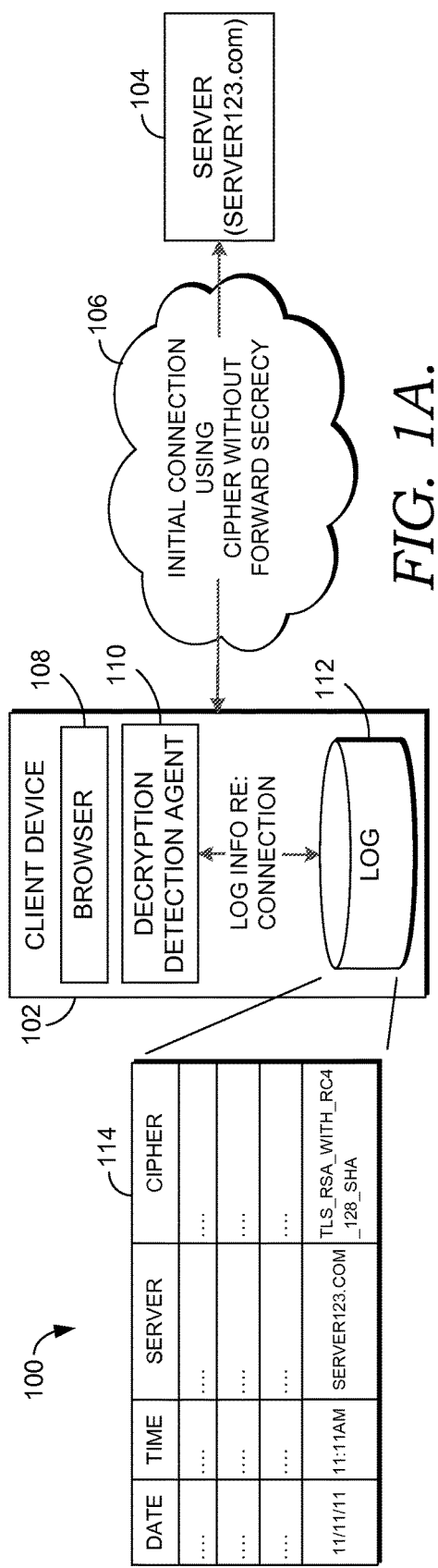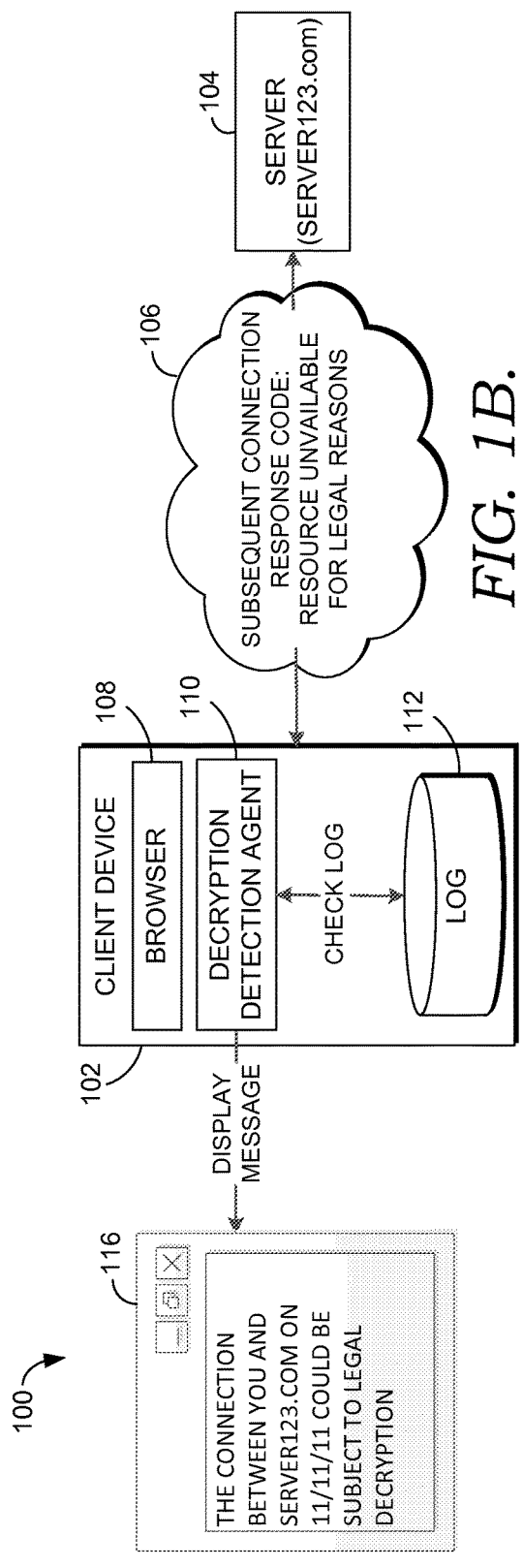

DETECTING POTENTIAL LEGAL DECRYPTION OF HISTORICAL DATA

BACKGROUND

Due to the open nature of the Internet, encryption is often used to protect data communicated between two devices. For instance, (Hypertext Transfer Protocol Secure) HTTPS is widely used to provide secure communications over the Internet. HTTPS is a protocol that provides a connection encrypted by Transport Layer Security (TLS) or its predecessor, Secure Sockets Layer (SSL) (collectively referred to herein as TLS). TLS traffic is encrypted with a shared session key created from a pair of asymmetric keys. The cipher used to generate that session key can be categorized as having forward secrecy or not. If the cipher used to encrypt data does not have forward secrecy, then a third party that captures all the encrypted data and at some point in the future gains access to at least one of the asymmetric keys can decrypt all the captured data. If the cipher uses forward secrecy, however, the third party could not decrypt the captured data. There are some circumstances in which encrypted data may be captured for legal reasons. If the captured data was encrypted using a cipher without forward secrecy, the captured data is subject to decryption. Currently, this is no way for a user to detect such legal decryption.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to detecting the potential legal decryption of historical data communicated between devices. During a first connection with a server, a client device determines that a cipher without forward secrecy is being used to encrypt data being communicated between the client device and server. In response to determining the first connection uses the cipher without forward secrecy, information regarding the first connection with the server is stored in a log. During a subsequent connection with the server, the client device receives a response code from the server indicating that a resource is unavailable for legal reasons. In response to receiving the response code from the server, the client device checks the log to determine that the client device previously communicated with the server using the cipher without forward secrecy during the first connection. A message is then presented indicating that data transmitted during the first connection could be subject to legal decryption.

BRIEF DESCRIPTION OF THE DRAWINGS

The present invention is described in detail below with reference to the attached drawing figures, wherein:

FIGS. 1A-B are diagrams illustrating an exemplary system in accordance with implementations of the present disclosure;

DETAILED DESCRIPTION

Figure 2:
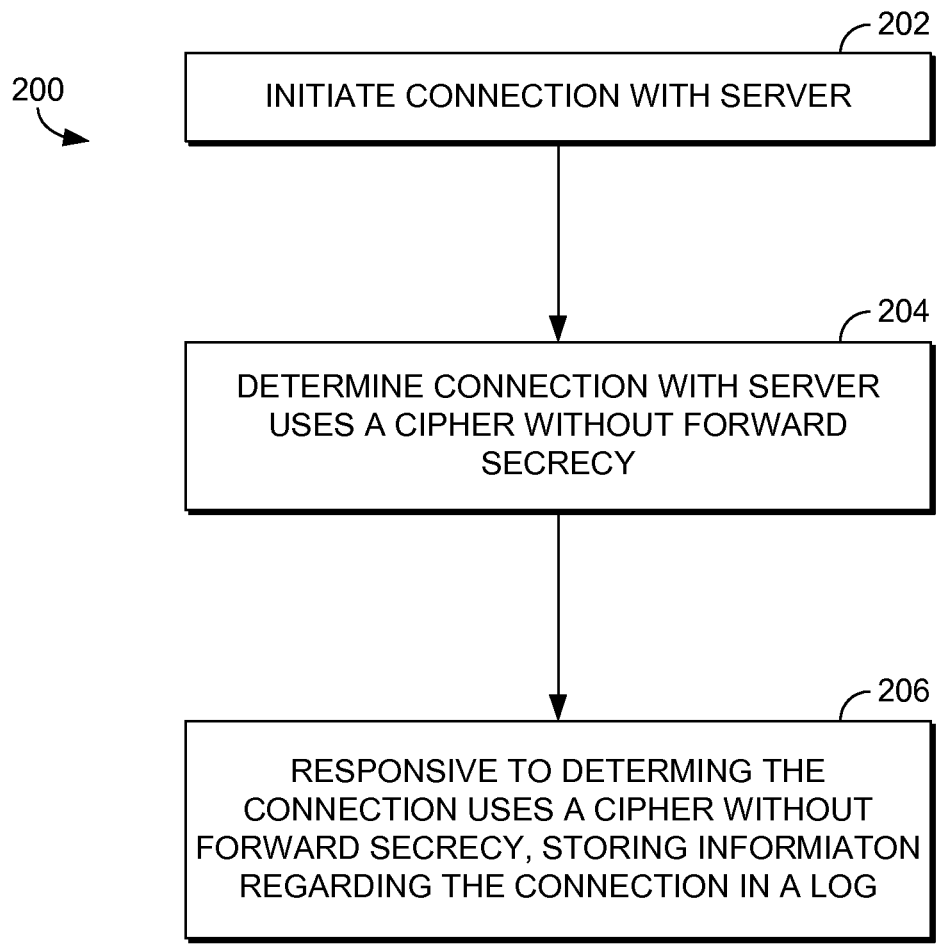
FIG. 2 is a flow diagram showing a method for logging information about a connection with a server that uses a cipher without forward secrecy in accordance with implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

As used herein, the term "connection" refers to a digital communication between two computing devices over one or more computer networks, such as the Internet, using any number of protocols, such as the HTTPS protocol. A connection between two devices can be initially established, for instance, via handshaking to establish the parameters of the connection. In instances in which a secure communication is being used, the handshaking may include determining the cipher to be employed in the encryption/decryption of data communicated between the devices during the connection. After establishing the connection, data (encrypted in cases of secure communications) is communicated between the devices via the connection.

The term "cipher" refers to an algorithm used in the encryption and/or decryption of data communicated over a connection between two computing devices.

The term "forward secrecy" (also known as perfect forward secrecy) refers to a property of a cipher that protects against future comprises of keys that can be used to decrypt encrypted data. An example of a cipher with forward secrecy is the TLS_ECDHE_RSA_WITH_AES_128_GCM_SHA256 cipher.

There are some situations in which encrypted data communicated over a network, such as the Internet, is captured for legal reasons. If a cipher without forward secrecy was used in the encryption of the captured data, it's possible that the captured data could be subject to legal decryption. However, there is currently no way for a user to detect whether such legal decryption occurs.

Embodiments of the present invention relate to detecting the potential decryption of data that was previously communicated over a network between devices. In accordance with embodiments of the present invention, when a device connects to a server, the device determines whether the connection is using a cipher without forward secrecy. If the connection is using a cipher without forward secrecy, information regarding the connection is logged by the device. When the device communicates with the server during a subsequent connection and receives a response code indicating that a resource is unavailable for legal reasons, the log is checked to determine if the device has previously communicated with the server using a cipher without forward secrecy. Based on the check, the previous connection is identified, and a message is presented indicating that data from the previous connection could be subject to legal decryption. Additional information regarding the previous connection could also be presented. This allows the user to identify when previously transmitted data may be subject to decryption and discovery by a third party.

With reference now to the drawings, FIGS. 1A and 1B are block diagrams illustrating an exemplary system 100 for detecting the potential legal decryption of historical data transmitted between devices in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

System 100 is an example of a suitable architecture for implementing certain aspects of the present disclosure. Among other components not shown, system 100 includes a client device 102 communicating with a server 104 over a communications network 106. Each of the components shown in FIGS. 1A and 1B may be implemented via any type of computing device, such as computing device 400 described with reference to FIG. 4, for example. The components may communicate with each other via the network 106, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present invention. Each may comprise a single device or multiple devices cooperating in a distributed environment. For instance, the server 104 may be provided via multiple devices arranged in a distributed environment that collectively provide the functionality described herein. Additionally, other components not shown may also be included within the network environment.

Turning first to FIG. 1A, an initial connection between the client device 102 and the server 104 is shown. For instance, the client device 102 includes a browser 108 that allows the client device 102 to communicate over the network 106 with devices, such as the server 104. Although FIG. 1A illustrates the client device 102 using a browser 108 for communications with the server 104, it should be understood that the browser 106 is shown by way of example only and any of a variety of applications may support network communication and be employed on the client device 102.

The client device 102 also includes a decryption detection agent 110, which may be a stand-alone application, browser plug-in add-in, web service or any other application that provides the functionality described herein. The decryption detection agent 110 analyzes the cipher (if any) being used by communications between the client device 102 and other devices, such as the server 104. In particular, the decryption detection agent 110 is configured to identify any connections using a cipher without forward secrecy. This may be done by identifying the cipher being used for a connection and determining whether that cipher uses forward secrecy (e.g., using a lookup table identifying ciphers with forward secrecy and/or ciphers without forward secrecy). If the decryption detection agent 110 identifies a connection using a cipher that does not have forward secrecy, the decryption detection agent 110 logs information regarding the connection in a log 112.

As shown in FIG. 1A, the initial connection between the client device 102 and the server 104 is a secure communication that uses a cipher without forward secrecy. For instance, the initial connection may be using the TLS_RSA_WITH_RC4_128_SHA cipher. Since the cipher does not provide for forward secrecy, the decryption detection agent 110 logs information regarding the initial connection with the server 104 in the log 112. As shown in FIG. 1A, the log 112 may include a table 114 listing a number of entries with information regarding connections between the client device 102 and other devices that used a cipher without forward secrecy (the specific information for the various connections is not shown in FIG. 1A for clarity purposes). The information logged for each connection may include, for instance, the date of the connection, the time of the connection, an identifier of the server (e.g., a domain name, IP address, etc.), and the cipher used for the connection. It should be understood that any of a variety of other information regarding a connection may be logged. In the present example, the last entry corresponds with the initial connection between the user device 102 and the server 104. In particular, the information logged for the initial connection includes: the date—11/11/11; time—11:11 am; server—server123.com; and cypher used—TLS_RSA_WITH_RC4_128_SHA.

FIG. 1B, illustrates a subsequent connection between the client device 102 and the server 104. In other words, the connection between the client device 102 and the server 104 in FIG. 1B comes after the initial connection in FIG. 1A. As shown in FIG. 1B, when the client device 102 and server 104 connect, the server 104 transmits, to the client device 102, a response code indicating that a resource is unavailable for legal reasons. For instance, the response code may be a HTTP 451 response code.

In response to receiving the response code, the decryption detection agent 110 checks the log 112 to determine if the client device 102 has previously communicated with the server 104. In some embodiments, this check is done by identifying a server name or identifier (e.g., domain name, IP address, etc.) of the server 104 from the current connection and querying the log 112 for any entries containing that server name/identifier. In the present example, the decryption detection agent 110 determines that the subsequent connection is with the server 104 having the server name server123.com. The decryption detection agent 110 checks the log 112 for any entries for previous connections with the server123.com server. From this check, the decryption detection agent 110 identifies a log entry for the initial connection from FIG. 1A. In response to finding this log entry, the decryption detection agent 110 causes a message 116 to be displayed that indicates data from the initial connection from FIG. 1A could be subject to legal decryption. The message may provide any combination of information regarding the initial connection. For instance, FIG. 1B illustrates a message that indicates: "The connection between you and server123.com of 11/11/11 could be subject to legal decryption."

Although FIGS. 1A and 1B illustrate an embodiment in which only a single previous connection between the client device 102 and the server 104 is logged, in practice, multiple connections between the client device and the server 104 that use a cipher without forward secrecy may be logged over time. Accordingly, in some instances, when a response code indicating that a resource is unavailable for legal reasons is returned to the client device 102 from the server 104, the decryption detection agent 110 identifies all entries in the log 112 with the server 104, and the message presented provides information regarding each of those previous connections with the server 104. Additionally, it should be understood that the log 112 may store information regarding connections using ciphers without forward secrecy with any number of servers or other devices.

Referring to FIG. 2, a flow diagram is provided illustrating a method 200 for logging information about a connection with a server that uses a cipher without forward secrecy. Each block of the method 200 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. The method 200 may be performed, for instance, by the decryption detection agent 110 of FIGS. 1A and 1B.

Initially, as shown at block 202, a connection is established with a server. A determination is made at block 204 that the connection with the server is using a cipher without forward secrecy. This determination may be made, for instance, by identifying the cipher being used for the connection and comparing the cipher against a list of known ciphers with forward secrecy and/or a list of known ciphers without forward secrecy. Based on determining that the connection with the server is using a cipher without forward secrecy, information about the connection is stored in a log (e.g., the log 112 of FIGS. 1A and 1B), as shown at block 206. A variety of different information may be stored about the connection. By way of example only and not limitation, the stored information may include, the date of the connection, the time of the connection, an identifier of the server (e.g., domain name, IP address, etc.), and the cipher used for the connection. More detailed information about the data transferred during the connection could also be stored, such as, for instance, the amount of data transferred, the type of data transferred (e.g., text, images, videos, audio), length of the connection, as well as a variety of other information.

Figure 3:
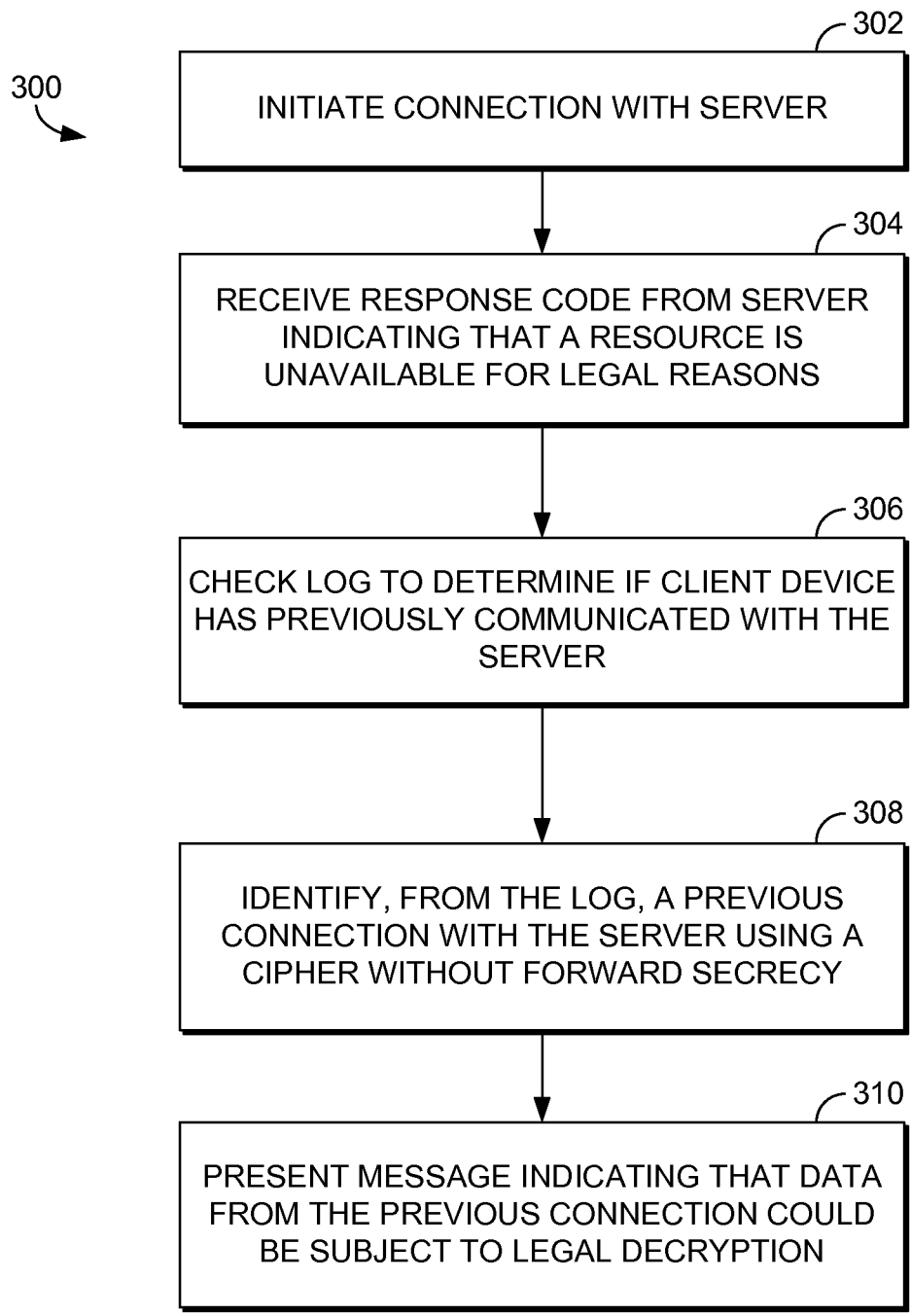
FIG. 3 is a flow diagram showing a method for detecting the potential legal decryption of historical data transferred between a device and a server in accordance with implementations of the present disclosure.

Turning now to FIG. 3, a flow diagram is provided that illustrates a method 300 for detecting the potential legal decryption of historical data transferred between a device and a server. The method 300 may be performed, for instance, by the decryption detection agent 110 of FIGS. 1A and 1B. As shown at block 302, a connection with a server is initiated. A response code is received from the server indicating that a resource is unavailable for legal reasons, as shown at block 304. For instance, the response code may be an HTTP 451 code.

In response to receiving the response code from the server, a log storing information about previous connections with various servers that used a cipher without forward secrecy is checked to determine if the device has previously communicated with this server, as shown at block 306. For instance, the log may be queried for entries that contain an identifier for the current server (e.g., domain name, IP address, etc.). A previous connection with the server in which a cipher without forward secrecy was used is identified from the check on the log, as shown at block 308. Based on identifying a previous connection with this server in which a cipher without forward secrecy was used, a message is presented indicating that data from the previous connection could be subject to legal decryption, as shown at block 310. Any information stored in the log for the previous connection may also be presented to provide additional information regarding the connection and/or what data was transferred.

Although the method 300 discusses only a single previous connection with the server, it's possible that multiple previous connections with the server were logged. In such instances, the message may provide information regarding each of those previous connections.

Figure 4:
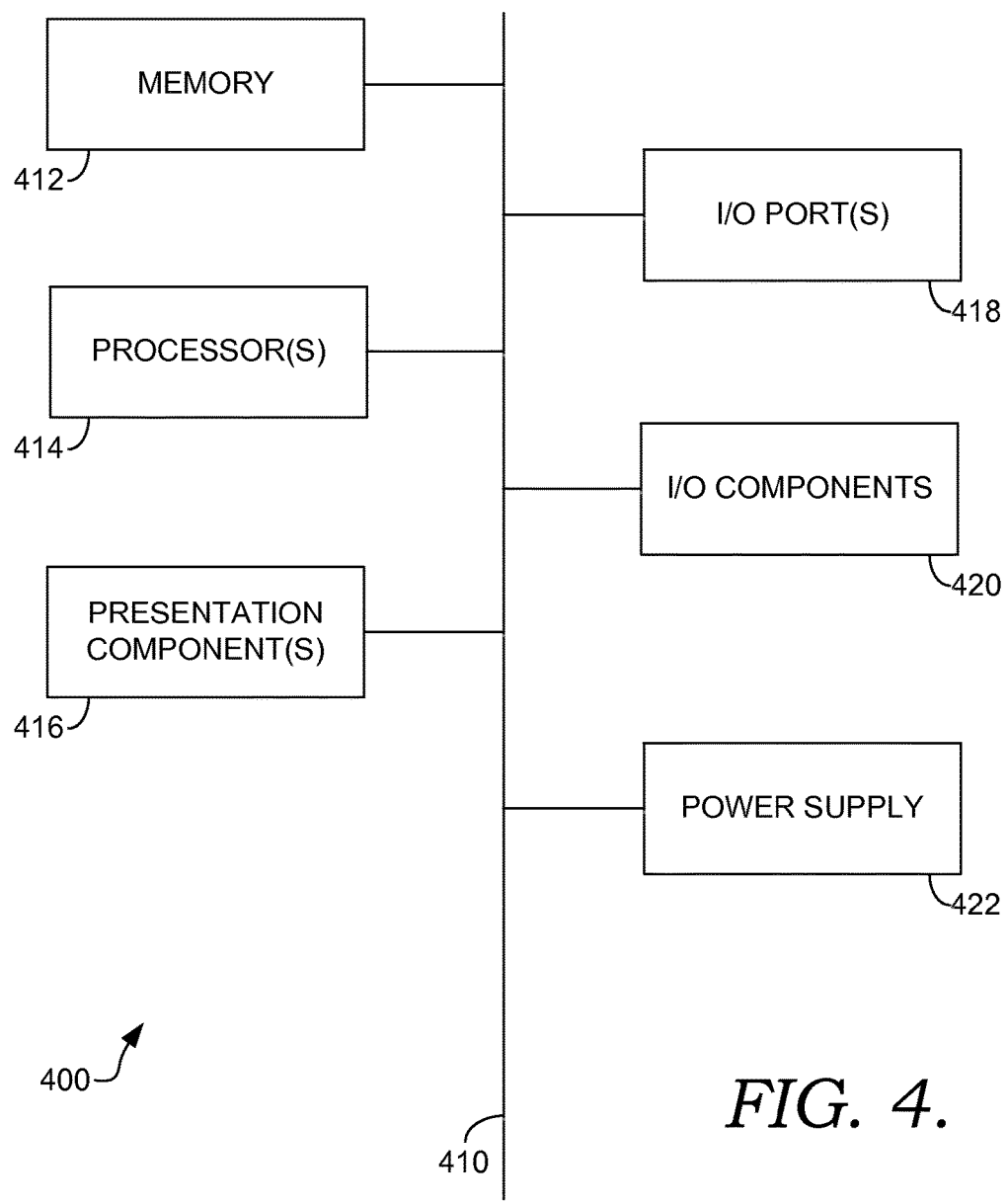
FIG. 4 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 4 in particular, an exemplary operating environment for implementing embodiments of the present invention is shown and designated generally as computing device 400. Computing device 400 is but one example of a suitable computing environment and is not intended to suggest any limitation as to the scope of use or functionality of the invention. Neither should the computing device 400 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 4, computing device 400 includes bus 410 that directly or indirectly couples the following devices: memory 412, one or more processors 414, one or more presentation components 416, input/output (I/O) ports 418, input/output components 420, and illustrative power supply 422. Bus 410 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 4 and reference to "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 400. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 412 includes computer-storage media in the form of volatile and/or nonvolatile memory. The memory may be removable, non-removable, or a combination thereof. Exemplary hardware devices include solid-state memory, hard drives, optical-disc drives, etc. Computing device 400 includes one or more processors that read data from various entities such as memory 412 or I/O components 420. Presentation component(s) 416 present data indications to a user or other device. Exemplary presentation components include a display device, speaker, printing component, vibrating component, etc.

I/O ports 418 allow computing device 400 to be logically coupled to other devices including I/O components 420, some of which may be built in. Illustrative components include a microphone, joystick, game pad, satellite dish, scanner, printer, wireless device, etc. The I/O components 420 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 400. The computing device 400 may be equipped with depth cameras, such as, stereoscopic camera systems, infrared camera systems, RGB camera systems, and combinations of these for gesture detection and recognition. Additionally, the computing device 400 may be equipped with accelerometers or gyroscopes that enable detection of motion.

As described above, implementations of the present disclosure relate to detecting potential decryption of previously transmitted data. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for detecting potential legal decryption of previously transmitted data, the method comprising:
   receiving, at a client device, a response code from a server indicating that a resource is unavailable for legal reasons during a current connection with the server;
   responsive to receiving the response code from the server, checking a log to determine if the client device has previously communicated with the server;
   identifying, from the log, a previous connection with the server using a cipher without forward secrecy; and
   presenting a message indicating that data from the previous connection could be subject to legal decryption.

2. The method of claim 1, wherein the response code comprises a 451 response code.

3. The method of claim 1, wherein the message includes information from the log regarding the previous connection with the server.

4. The method of claim 3, wherein the information regarding the previous connection comprises at least one selected from the following: a date of the previous connection; a time of the previous connection; an identification of the server; and an indication of the cipher used by the previous connection.

5. The method of claim 1, wherein the method further comprises:
   during the previous connection, determining that the connection is using the cipher without forward secrecy;
   responsive to determining the connection is using the cipher without forward secrecy, storing information in the log regarding the previous connection with the server.

6. The method of claim 1, wherein checking the log to determine if the client device has previously communicated with the server comprises:
   identifying a server identifier for the server from the current connection; and
   determining if any entry in the log includes the server identifier.

7. The method of claim 6, wherein identifying, from the log, the previous connection with the server using the cipher without forward secrecy comprises: identifying an entry in the log that includes the server identifier.

8. The method of claim 6, wherein the server identifier comprises a domain name.

9. One or more computer storage media storing computer-useable instructions that, when executed by a computing device, causes the computing device to perform operations, the operations comprising:
   determining a first connection with a server uses a cipher without forward secrecy;

responsive to determining the first connection uses the cipher without forward secrecy, logging information regarding the first connection with the server;

during a subsequent connection with the server, receiving a response code from the server indicating that a resource is unavailable for legal reasons;

responsive to receiving the response code from the server, retrieving at least a portion of the information regarding the first connection with the server; and presenting a message providing the at least a portion of the information regarding the first connection.

10. The one or more computer storage media of claim 9, wherein the message indicates that data transmitted during the first connection could be subject to legal decryption.

11. The one or more computer storage media of claim 9, wherein the response code comprises a 451 response code.

12. The one or more computer storage media of claim 10, wherein the information regarding the first connection with the server comprises at least one selected from the following: a date of the first connection; a time of the first connection; an identification of the server; and an indication of the cipher used by the first connection.

13. The one or more computer storage media of claim 10, wherein retrieving at least the portion of the information regarding the first connection with the server comprises:
   identifying a server identifier for the server from the subsequent connection; and
   identifying an entry in a log that includes the server identifier and the information regarding the first connection with the server.

14. The one or more computer storage media of claim 13, wherein the server identifier comprises a domain name.

15. A computer system comprising:
   one or more processors; and
   one or more computer storage media storing computer useable instructions to cause the one or more processors to:
      determine a first connection with a server uses a cipher without forward secrecy;
      responsive to determining the first connection uses the cipher without forward secrecy, log information regarding the first connection with the server;
      during a subsequent connection with the server, receive a response code from the server indicating that a resource is unavailable for legal reasons;
      responsive to receiving the response code from the server, check a log to determine if the client device has previously communicated with the server;
      identify, from the log, information regarding the first connection with the server; and
      present a message indicating that data from the first connection could be subject to legal decryption.

16. The system of claim 15, wherein the response code comprises a 451 response code.

17. The system of claim 15, wherein the information regarding the first connection with the server comprises at least one selected from the following: a date of the first connection; a time of the first connection; an identification of the server; and an indication of the cipher used by the first connection.

18. The system of claim 15, wherein the log is checked to determine if the client device has previously communicated with the server by:
   identifying a server identifier for the server from the subsequent connection; and
   querying the log with the server identifier to identify any entry in the log that includes the server identifier.

19. The system of claim 18, wherein information regarding the first connection with the server is identified from the log by identifying an entry in the log that includes the server identifier.

20. The system of claim 19, wherein the server identifier comprises a domain name.

* * * * *